Dec. 24, 1957
J. H. QUINN
2,817,424
HYDRAULICALLY OPERATED IGNITION SWITCH
AND BRAKE CONTROL DEVICE
Filed Dec. 9, 1953
2 Sheets-Sheet 1
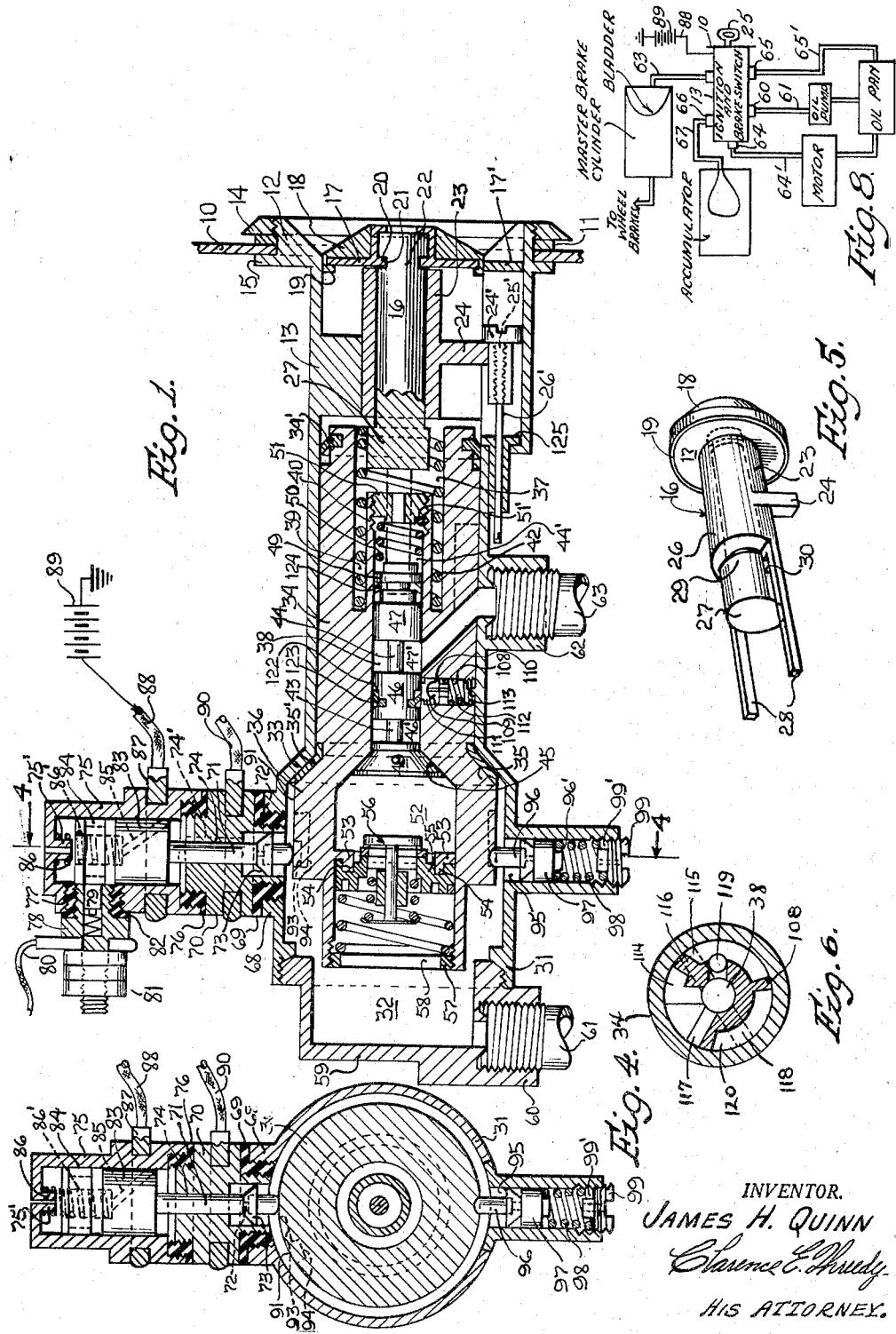
INVENTOR.
JAMES H. QUINN
HIS ATTORNEY.

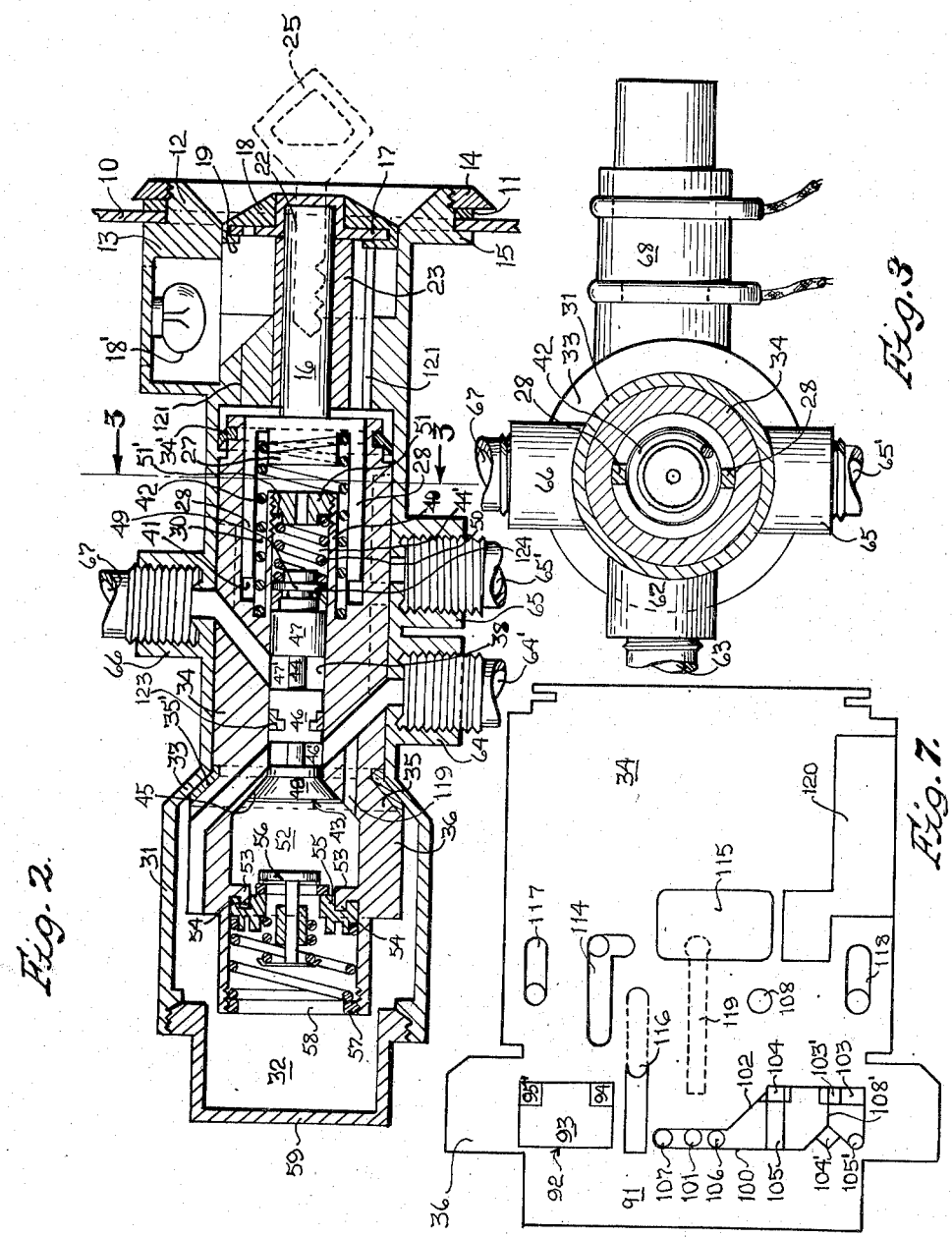

United States Patent Office 2,817,424
Patented Dec. 24, 1957

2,817,424

HYDRAULICALLY OPERATED IGNITION SWITCH AND BRAKE CONTROL DEVICE

James H. Quinn, Chicago, Ill.

Application December 9, 1953, Serial No. 397,217

13 Claims. (Cl. 192—3)

My invention relates to a hydraulically operated ignition switch and brake control device and has for its principal object the provision of a hydraulically operated ignition and brake system for internal combustion engines.

Another and equally important object of my invention is the provision of a fully automatic ignition key starting system whereby an internal combustion engine may be placed in operation.

Still another equally important object of my invention is the provision of an ignition key operated hydraulic hand brake system, that features power hand braking and improves the reliability of the regular hydraulic braking system and does not interfere with its operation.

Still another and equally important object of my invention is the provision of a construction whereby the hydraulic braking system is automatically maintained for safe operation.

Still another and important object of my invention is the provision of an automatically operated pre-starting lubrication of the internal combustion engine.

A further object of my invention is the provision in the ignition key operated system of releasing a vehicle hood lock.

A still further object of my invention is the provision in the invention of this character of a fully automatic stall starting system.

A still further and equally important object of my invention is the provision of providing a virtually burglar-proof ignition and brake system for an internal combustion vehicle.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a top sectional detail view of my key operated ignition and brake system showing the parts in a normal "off" position;

Fig. 2 is a side sectional detail view similar to Fig. 1;

Fig. 3 is a sectional detail view taken substantially on line 3—3 of Fig. 2;

Fig. 4 is a sectional detail view taken substantially on line 4—4 of Fig. 1;

Fig. 5 is a perspective view of the tumbler lock as employed in my invention;

Fig. 6 is a diagrammatical sectional view of the piston head as employed in my invention and showing the substantial location of oil passages therein;

Fig. 7 is a diagrammatic linear view of the otherwise circular piston head and showing, in superimposed relation thereon, the various guide routes and oil passages; and Fig. 8 is a schematic diagram showing the hydraulic operated ignition switch and brake control device together with its associated parts of a standard internal combustion engine.

My invention is a vast improvement over the ignition key starting switches now employed on present day automobiles. When the present day automobile is to be started, the starter switch is manually actuated by the ignition key and held in that position against a spring until the internal combustion motor starts. In my invention to achieve the same results one would simply turn the ignition key to the desired motor running position and then let go of it. From that point the ignition system and the hydraulic brakes are regulated automatically. The motor is automatically lubricated sufficiently to protect it against wear before the starting system is placed in operation. When the internal combustion motor starts, the starter motor thereof is automatically deenergized. The period of energization of this starter motor is simply adjusted by a convenient means embodied in my invention which will prevent the motor from stalling after it is first energized. My invention is so constructed as to prevent any spark gapping or burning of contact points by virtue of the continued energization of the ignition system and by the rapid circuit breaking of its contact points. My invention also provides a system whereby the starter motor is prevented from being accidentally energized while the motor is running, this constituting a great improvement over the present day solenoid starter switches now employed on most present day automobiles.

My invention embodies the use of a standard oil system of an internal combustion engine with the addition of a hydraulic accumulator. Such system and accumulator are not shown or described as they are well known in the art.

Fig. 1 depicts my improved hydraulic ignition and brake switch in its normal "off" position. This switch is adapted to be mounted to the dashboard 10 of a vehicle by means of a lock washer 11 which is frictionally fitted upon a protruding lip 12 of the ignition switch housing 13. The washer 11 bears against the dashboard 10 and is held thereby a retaining ring 14 which is threaded on the lip 12. The housing 13 is provided with a shoulder 15, which, as shown in Fig. 1, bears upon the inner side of the dashboard 10, thus securely mounting the housing 13 thereto.

Adapted to be held within the housing 13 is a standard tumbler lock 16. This lock has face plate 17 which is secured to an indicating dial 18 by means of a flange 19 behind which the dial 18 is adapted to be snapped into place. The dial 18 has a like flange 20 which is snapped into a retaining cut 21 formed in the lock shaft 22. The lock 16's outer case 23 is provided with a laterally extending lug 24. This lug 24 bears against the head 24' of a screw 25' threaded into the hook release cable 26' which goes into its armor cable 125 and extends through the housing 13 as shown in Fig. 1, the purpose and function of which will be hereinafter described. Also 17' which is an extension of face plate 17 fits into the front part of the housing for screw 25', thus preventing the unscrewing of screw 25' by a potential vehicle thief.

However, by inserting the ignition key 25 into lock 16 and rotating it to the "H" (hood release) position or "BR" (the brakes-on motor running) position and then by pulling outwardly on key 25 far enough to allow extension 17' to clear the housing or screw 25', face plate 17 and extension 17' may be rotated far enough to one side to allow the unscrewing of screw 25' and the removal of lock 16 and its component parts from housing 13. The housing 13 also provides to the rear of the dashboard 10 the indicating dial 18 and a receptacle for a light 18' which may be used to illuminate, through slits cut in the dial 18 and face plate 17, the various positions of the dial 18.

The tumbler lock 16 is of any standard construction and is one which allows the key 25 to be inserted and removed from it in two given positions, namely the "T" (or towing) position and the "off" position of the face plate 17. Such a lock construction is well-known in the lock art and as such the lock 16 per se as employed herein makes up no part of my present invention, with the exception, however, of lug 24 and the rotatable section 26 of the lock 16. To this lock I provide a circular head 27. This head 27 is provided with a pair of forwardly extending key fingers 28. These fingers as shown in Fig. 2 extend outwardly and forwardly from the rear portion 29 of the head 27, thereby forming retaining passages 30 between the fingers 28 and the head 27.

Adjacent the end 31 of the housing 13 opposite the dashboard 10, the housing 13 flares outwardly to form an oil chamber 32. At the point of flare the housing 13 forms a piston seat 33. Within the housing 13 and forward of the lock 16 is slidably arranged a hollow piston 34. This piston 34 has a corresponding flare 35 which provides the piston 34 with an enlarged head portion 36. The corresponding flared edge 35 of the head portion 36 of the piston 34 receives a gasket 35' which is adapted to sit on the seat 33 formed in the housing 13 in between the flared edge 35 and the valve seat 33. In order to prevent oil from leaking out of the rear of housing 13 an oil cup 34' is attached to the rear of the piston 34 as shown in Figs. 1 and 2. The piston 34 at the end nearest the dashboard 10 is provided with a large center bore 37. From this bore 37 and extending parallel to the center bore 38 of the piston 34 are spring pockets 39 formed between the piston wall and a partial inner wall 40 of the piston 34 as shown in Figs. 1 and 2. Positioned in these pockets 39 is a compression coil spring 42 as shown in Figs. 1 and 2. Also as shown in Figs. 2 and 3 there are adjacent these spring pockets 39, on opposite sides of and extending parallel to the center bore 38, finger receiving passages 41.

In assembling, the lock 16 is secured at one end of the housing 13 as hereinbefore described. The piston 34 is slidably placed in the housing 13 from the opposite end and projects inwardly until the flared walls 35 and 35' contact the seat 33. At this point the head 27 of the lock 16 will be in spaced apart position within the bore 37 of the piston 34 as shown in Figs. 1 and 2 and the key fingers 28 of the lock 16 will be inserted in the passages 41 formed in the piston 34. The coil spring 42 will be positioned in the pocket 39 and the retaining passages 30 of the circular head 27, so as to embrace the head 27 and the inner wall 40 of the piston 34. The tension of the coil spring 42 will be regulated by the screw 25' being threaded into the cable 26' thereby forcing the housing 13 through lug 24 up into the bore 37.

Slidably arranged in the center bore 38 of the piston 34 is a valve 43 having a valve stem 44. The valve 43 is adapted to sit as at 45 in the portion of the head 36 of the piston 34 under an arrangement much like the arrangement between the piston 34 and the housing 13. The stem 44 is provided with a pair of spaced apart lands 46 and 47 which provide passages 46' and 47' therebetween. These washers 46 and 47 are of a like diameter as the center bore 38 of the piston 34 and therefore are slidably arranged therein. As these lands 46 and 47 are fixedly secured to the stem 44 it is readily apparent that they will move therewith through the center bore 38 of the piston 34. In order to prevent oil from leaking out of chamber 47' and into chamber 46' an oil cup 123 is attached to the washer 46. In order to prevent oil from leaking out of the rear of bore 38 an oil cup 124 is attached to valve 43 in between lands 47 and 49 as shown in Fig. 1 and 2. Adjacent the end of the stem 44 opposite the valve head 48 is a retaining washer 49. Engaging this washer 49 and embracing the end of the stem 44 is a coil spring 50. This spring 50 sits in a guide 44' formed at the end of the stem 44. The opposite end of this spring 50 sits in a guide 51' and bears against a threaded breather cap 51 which is threaded into the open end of the center bore 38 between the inner wall 40 of the piston 34 as shown in Figs. 1 and 2. The tension of the spring 50 against the washer 49 may be adjusted by means of this threaded cap 51. The spring 50 will normally be of such tension as to unseat the valve head 48 at a predetermined time. The purpose and function of this arrangement of parts will be hereinafter described.

To the front of the valve head 48, in the piston 34, there is formed a small oil chamber 52. At the front of this oil chamber 52 there are provided by the walls of this piston 34, depending flanges 53 that have forwardly extending fingers 54 which provide a seat 55 for a two-way relief valve 56. This relief valve may be of any standard construction and therefore its function will be the same as if employed in any other use. This relief valve 56 is held in place at the forward end of the oil chamber 52 by a threaded retaining washer 57 threaded into the open end 58 of the piston 34 as shown in Figs. 1 and 2, the tension and operation of this relief valve being regulated by the adjustment of the washer 57.

The housing 13 at the end opposite its attachment to the dashboard 10 is closed by a cap 59 threaded thereon. This cap 59 is provided with an internally threaded boss member 60 which is adapted to receive an oil line 61 from an oil pump of an internal combustion engine not shown. As boss member 60 is set at right angles to end cap 59 and housing 13, oil entering chamber 32 from oil line 61 is forced to whirl around therein, thereby producing a centrifugal force which throws any foreign material (that might slip past the vehicle's oil filter, not shown) outward, thereby preventing it from entering chamber 52 as the inlet hole for chamber 52 is located in the center of the centrifuge through check valve 56. Also the whirling action of the oil in chamber 32 cleans and lubricates all of the components therein.

The housing 13 also provides four other identical bosses. One of these bosses 62 is intermediate the ends of the housing 13 and on the same side and substantially in the same plane as boss 60 and has a line connection 63 to a master brake cylinder (not shown). The master brake cylinder is of a standard construction with the exception that a bladder (not shown) made of oil resistant rubber (as are all the rubber parts that go into the combination braking system) is attached to the master brake cylinder's filler plug and is inserted into the top of the master brake cylinder's reservoir. Therefore the brake fluid in the braking system is separated from the crank case oil coming from boss 62 by the rubber bladder. However, the oil pressure sent to the bladder by oil line 63 is transferred to the brake fluid in the braking system by the expansion of the rubber bladder. As there is no breather hole in the master brake cylinder's filler plug the entire combination braking system is sealed in and under pressure while the hydraulic hand brake is on. However, when the hydraulic hand brake is turned off, there is a breather action via the expansion and contraction of the rubber bladder and the movement of the oil therein leading through oil line 63 to boss 62 through the oil routes 120 (cut into piston 34) in the "D" (drive) or "P" (pushing) position of the face plate 17, or through oil route 115 (cut into piston 34) when the ignition key is turned to the "T" (towing) position of face plate 17. From oil routes 120 or 115 the oil leads to boss 65 and oil line 65'. Oil line 65' leads into the oil pan of the motor (not shown) and has attached to its end a standard adjustable two-way relief valve which permits the rubber bladder located in the master brake cylinder reservoir to expand or contract and a breathing action to take place.

Should the brake fluid ever leak out of the regular braking system and the hydraulic hand brake be turned on, the rubber bladder located in the master brake cylinder's reservoir will burst (because there is no oil on the other side of the bladder to contain it), thus sending emergency oil from the accumulator or the motor's crank case (via the motor's oil pump, if the motor is revolving) to the braking system, thereby applying the brakes.

It should also be noted that this system of hydraulic hand braking is self-adjusting, in that as the regular brake linings wear down or as the hydrualic brake fluid is dissipated, more oil is automatically sent to the bladder located in the master brake cylinder's reservoir. This causes it to expand more and to send more hydraulic brake fluid into the braking system's wheel cylinders and this forces the brake shoes up against the brake drums and applies the hand brake.

The other three bosses 64, 65 and 66 are on the bottom and top of the housing 13 and substantially opposite each other, as shown in Fig. 2. The boss 64 has a hose connection 64' to a motor (not shown) and the boss 65 has a hose connection 65' to the oil pan of the motor (not shown) while the boss 66 has a like hose connection 67 to an accumulator (not shown). The bosses 60, 64, 65 and 66 respectively have open connections with passages formed through the housing 13 and the piston 34, which passages communicate with the center bore 38 as shown in Figs. 1 and 2. The purpose and function of these passages will hereinafter be described.

The housing 13 has on its side opposite the bosses 60 and 62 an oversize boss 68. Into this boss 68 is threaded a nonconductive hollow gasket 69. In this hollow gasket 69 is a starter motor contact housing 70. This starter housing 70 in its lower portion has its outer surface threaded upon the bore of the gasket 69. Into the bore formed in the lower portion of the housing 70 there is positioned a non-conductive slidable guide pin 71. This guide pin 71 has formed in its peripheral edge a groove 72 which groove is adapted to receive and hold oil retaining cap 73. The housing 70 is provided at its upper end portion with a center passage 74 of a diameter equal to that of the pin 71 but smaller than that of the gasket 69. Adapted to be secured to the upper end of the housing 70 is a top sealing member 75. However, between the member 75 and the housing 70 there is positioned a second non-conductive gasket 76, as shown in Fig. 1.

Before assembling the top sealing member 75 to the housing 70 there is slidably inserted into the top sealing member 75 an ignition switch contact cylinder 83. The upper end of this cylinder 83 has secured within a groove formed in its peripheral edge, an electric insulator 84. The cylinder 83 is provided with a breather passage 85 which passage 85 has open communication with the passage 74' of the contact housing 70, and with the outside of the unit through spring housing hole 86' and through the hole cut in the center of spring retaining pin 75', which permits a breathing action to take place when the pin 71 moves in the housing 70, and when cylinder 83 moves in the top sealing member 75. Between the cylinder 83 and the top wall of the top sealing member 75 is a small compression spring 86 adapted to urge the cylinder 83 in a downward direction. Connected as at 87 to the top sealing member 75 is a wire conductor 88 having connection to a power source (battery) 89. The contact housing 70 by a conductor wire 90 is connected to a starter motor (not shown). It should be noted that on vehicles that employ a solenoid to mechanically engage a starter motor drive pinion an extra wire may be connected to housing 70 and lead to the solenoid.

At one side of the top sealing member 75 there is a threaded opening 77 into which is threaded an ignition control valve 78. Carried within this valve 78 is a spring-urged ignition switch contact plunger 79. The valve 78 is connected by a conductor wire 80 to the ignition system of the internal combustion engine (not shown). The wire 80 is secured to the valve housing by a series of retaining nuts 81. It should be noted that between the member 75 and the valve 78 is a third nonconductive gasket 82.

The operation of the above described arrangement is as follows:

The pin 71 has its lower end extending through the boss 68 of the housing 13 and rests on the wall of the head 36 of the piston 34. The upper end of the pin 71 passes through the contact housing 70 and engages the bottom side of the cylinder 83 as shown in Fig. 1. At this point, it should be noted that the plunger 79 is in contact with the insulator 84 of the cylinder 83 and therefore no electrical power is passed from the power source 89 through the top sealing member 75 to the plunger 79. At the same time the pin 71 is holding the cylinder 83 out of contact with the housing 70, which housing has connection through the conductor wire 88 to the starter motor. Thus, it is readily seen that there is no circuit by which the internal combustion engine may be started. However, it is readily seen that as the pin 71 is lowered (by a manner hereinafter described) the cylinder 83, by the action of the spring 86, will fall in to the top sealing member 75. This movement of the cylinder 83 will instantly complete a circuit from the power source 89 through the conductor wire 88 to the ignition system via the plunger 79, the valve 78, and the conductor wire 80. As the pin 71 continues to fall, it will permit the bottom edge of the cylinder 83 to come into contact with the top of the housing 70, thus completing an electrical circuit from the power source 89 to the starter motor via conductor 88, and the ignition switch via the conductor 80, thus establishing an electrical circuit by which the internal combustion motor may be started.

To permit the pin 71 to move as aforementioned, the wall face 91 of the piston 34 adjacent its point of contact with the pin 71 is provided with a series of guide routes 92 terminating into detents of various depths. The first of these guide routes 93 permits the initial movement of the pin 71 as hereinbefore described. The connecting guide 94 which is deeper than the guide route 93 allows the complete falling movement of the pin to take place. These guide routes are so positioned on the wall face 91 of the piston 34 that they are presented to the pin 71 and guide the same in a predetermined manner, the exact manner of operation being hereinafter described.

In the wall of the housing 13 between the bosses 60 and 62 directly opposite the bosses 68 is a passage 95. Positioned within this passage is a guide pin 96 having one free end thereof engageable with the head 36 of the piston 34. Within the passage 95 and carried by the guide pin 96 is an oil control cup 97 which performs the same as the cup 73 of the pin 71. The pin 96 is urged into contact with the piston 34 by a spring 98 held within the passage 95 by an adjusting screw 99 which at its inner end provides spring guides 99'. This guide pin 96 also has at its inner end a spring guide 96'. Guide pin 96 is adapted to ride in guide routes 100 also formed in the wall face 91 of the head 36 of the piston 34. These guide routes are shown in Fig. 7. Their function will be described when the complete operation of the ignition switch is hereinafter explained.

For a fuller understanding of the location and function of the various guide routes 100 and detents thereof formed in the head 36 of the piston 34, a careful study of Fig. 7 should be made.

In Fig. 7, which is a flat view of the otherwise circular piston head 36, there is shown the position and relation of the various routes for the pins 71 and 96.

Taking first the pin 71 and its routes: It should be noted that in normal "off" position of the key 25, the pin 71 will ride on the normal surface of the head 36. As the key 25 is turned toward the "D" (drive) position, it becomes necessary to start and maintain the ignition motor and system of the vehicle. To do so, the piston 34, as it is rotatably, as well as slidably arranged in the housing 13, is forced to rotate by the turning of the key 25. This is accomplished through the key fingers 28 which are protruding into the passage 41 of the piston 34. As the piston rotates, the pin 71 will ride off the head 36 into the route 93 and as the route 93 is cut into the head 36, the pin 71 falls therein. As the pin 71 thus falls, it permits contact to be made with the battery and the ignition system of the vehicle as hereinbefore described. As the piston 34 continues to move forward, the pin 71 rides in the route 93 and falls into a stop point 94. This stop point 94 is deeper than the route 93 and thus the pin 71 is permitted to fall farther into the piston 34. As the pin 71 thus falls, an electric circuit from the battery to the ignition system and the starter motor is completed, thus starting the combustion engine of the vehicle.

As the engine begins to run, a standard oil pump (not shown) commences to operate. This pump forces oil into the chamber 32 and when sufficient pressure is built up in the chamber, guide pin 96 rises upwardly and goes out of route 103, thus causing piston 34 to be forced rapidly back into the housing 13 onto its seat 33. As the piston 34 moves backwardly rapidly, the pin 71 is forced to jump up out of the stop point 94 rapidly and go into the route 93. As this takes place the circuit to the starting motor is broken but the circuit from the power source to the ignition system is maintained, thus permitting the continued operation of the engine.

It should be noted that in the piston head 36 there is a stop point 95' which is identical to the stop point 94 but positioned in a different relation with respect to the route 93. This stop point 95' is used in the same manner as the point 94 with the exception that the pin 71 drops therein only when the key 25 is turned to the "BR" (brake-on, motor running) position. It should also be noted that should the oil pressure in chamber 32 ever for any reason become dangerously high, oil pressure would force oil cup 73 and pin 71 upwardly, thereby breaking the circuit to the ignition coil and stopping the motor. After the oil pressure is dissipated sufficiently, the motor will automatically be started again as hereinafter described. It should be also noted that if for any reason the motor of the vehicle fails to start while pin 71 is in stop point 94 or 95' and an attempt is made to manually rotate the ignition key 25 to any other position of face plate 17 it may not be done so easily. This is true because the head of pin 96 would be in either stop point 103 or 104, thus preventing piston 34 from being easily rotated. However, by putting a rather large amount of rotational pressure upon key 25, pin 96 would be forced upwardly and out of stop point 94 or 95' and piston 34 would be rotated. Therefore, because there was a rather large amount of rotational pressure placed upon key 25 and piston 34, once the pin 96 clears stop point 103 or 104 momentum will cause piston 34 to rotate rapidly and the pin 71 to strike the side wall of electrical stop point 94 or 95' with enough rapidity to cause it to jump upwardly fast enough to break the circuit to the starter motor rapidly enough to prevent any spark gapping or burning of its contact points 83 and 70. The same holds true should the circuit to the ignition system be deliberately turned off. In order to accomplish rotation of the piston 34 as it falls laterally in the housing 13, the piston head 36 is provided on its opposite side with guide routes 100 for the guide pin 96. As the piston 34 is initially turned by the key 25 toward the "BR" position, the guide pin 96 is forced out of a stop point 101 past stop point 106. As the piston 34 now moves by pressure of the spring 42, the guide pin 96 rides in a guide path 102 which, as shown in Fig. 7, is tapered rearwardly of the head 36 of the piston 34. As the guide pin 96 thus rides in the guide path 102 it forces the piston 34 to rotate as the piston is moved longitudinally forward with respect to the housing 13 by the spring 42. This rotation is continued until guide pin 96 is forced by its spring into a stop point 104, at which time the pin 71, which has been moving simultaneously therewith, has completed its falling movement thereby starting the motor. As the motor commences to run, oil pressure is built up in oil chamber 32 (and chamber 52 and the accumulator as hereinafter described) and when a sufficient pressure is therein developed oil cup 97 and pin 96 rise upwardly against spring 98 (via oil pressure) and pin 96 is retracted out of stop point 104. This causes piston 34 to be pushed back rapidly against its valve seat 33 and to remain there for so long as the motor is running and for pin 96 to ride into route 105 and for pin 71 to break the circuit to the starter motor rapidly as hereinbefore described. It should be noted however that oil pressure continues to build up in chamber 32, 52 and the accumulator even after piston 34 is seated on its valve seat 33. This is so because land 46 is restricting the flow of oil through chamber 46' and continues to do so until valve head 48 of valve 43 is seated on its valve seat 45 as hereinafter described.

From a study of Fig. 7, it will be noted that the various routes for the guide pin 96 are strategically placed so as to cooperate with the guide routes for the pin 71. There is also provided in routes 100 a stop point 103 which has communication with route 108'. These routes are used when the ignition key 25 is turned to the "D" (drive) position and they work the same as routes 104 and 105.

Also when my invention is employed with a vehicle using an automatic transmission, stop point 105' is cut into route 100. The purpose of stop point 105' is to prevent piston 34 from moving forward and automatically restarting the vehicle's motor should the motor die while the ignition key 25 is in the "D" position of face plate 17, as this might be considered an unsafe operation with an automatic transmission. However, by deliberately pushing in one key 25 and face plate 17, thereby putting additional pressure on guide pin 96 which would cause it to move upward and out of stop point 105', the motor may be started while the ignition key 25 is in the "D" position.

Also to either side of the stop point 101 there are stop points 106 and 107. The stop point 107 is employed when the key 25 is turned to the "T" (towing) position. The stop point 106 receives the guide pin 96 when the key 25 is turned to open the hood. It should be noted that the stop points are slightly deeper than the guide routes and thereby hold the guide pin until additional pressure is applied to the piston 34 either manually or hydraulically. However, the stop points have provided at either side thereof a slightly tapered upper wall which permits pins 71 and 96 to be forced up and out of the deeper stop points. It should also be noted that the path along stop points 106 and 107 is set at a slight angle. This causes pin 96 to bear against the side wall of this path, thereby forcing the valve head 36 and gasket 35' against the valve seat 33 as the key 25 is rotated toward the "H," "off" or "T" position. This prevents oil from leaking out of the front part of piston 34.

There is also provided in routes 100, route 104', which is a triangularly shaped route, the purpose of which is to prevent the ignition key 25 from being accidentally turned from "BR" position to the "D" position or vice versa. This is brought about by the shape of route 104' which would force piston 34 downward as it revolves from the "BR" to the "D" position or vice versa, via pin 96. Now, because there is oil pressure in chamber 32 and at the front part of piston 34 (while the motor is running or while the motor is being oiled before it is started, as hereinafter described), piston 34 may not be rotated past route 104' with ease because it would first have to move downwardly against oil pressure and this would have to be done deliberately. Therefore, as the brakes are on the "BR" position and they are off in the "D" position of the face plate 17 it may also be stated that the brakes cannot be accidentally turned on or off. Route 104' also has another purpose in that, as piston 34 is forced downwardly via pin 96, as it passes by route 104' the oil passages 117 and 118 restrict the flow of oil out of boss 64 via their new location. This causes oil pressure to build up in chamber 32 and to be sent into the accumulator and stored as hereinafter described.

There is also provided in routes 100, route 103' which is, except for its location, essentially the same as route 103. Route 103' is employed when the key 25 is rotated to the "P" (pushing) position of the face plate 17. This position is used when it becomes necessary to push the vehicle in order to get its motor started. In the "P" position, pin 96 is in route 103' but electrical guide pin 71 is in route 93 and not in route 94. Therefore the ignition circuit to the motor is completed but the circuit to the starter motor is not. Once the motor starts, oil pressure builds up in chamber 32 and causes pin 96 to rise upwardly out of route 103'. This causes piston 34 to shoot upwardly toward its valve seat. As it moves upwardly, pin 96 strikes the side of route 104' and forces the piston 34 to revolve as it moves upwardly until piston 34 is seated on its valve 33. Pin 96 drops down into stop point 105' if an automatic transmission is employed.

Cut into the side wall of the piston 34 is an internally threaded passage 108. This passage 108 has open communication with the center bore 38 of the piston 34. The passage 108 is adapted to receive a stop head 109. This stop head 109 is provided with laterally extending ridges 110 which fit upon a shoulder 111 formed in the inner end of the passage 108. Behind the stop head 109 is a compression spring 112 held in place by a set screw 113 threaded into the passage 108. The purpose of the stop head 109 is to maintain the valve 43 in unseated position when it falls into the oil chamber 52.

As the valve 43 falls into the chamber 52 the stop head 109 will come to rest between the lands 46 and 47, thus holding the valve 43 in such unseated position. As this stop head 109 is semicircular, it is apparent that as the oil pressure is built up in chamber 52, it will become strong enough to press the land 46 against the stop head 109 and eventually force it against the action of the spring 112 back into the passage 108. Adjusting the tension on springs 112 and 50 determines just how much oil pressure will be built up and stored in the accumulator. Oil pressure is built up in chambers 32 and 52 and is stored in the accumulator by valve 43 and land 46 moving forward and restricting the flow of oil leading into chamber 46 and the vehicle's motor from oil route 116.

Once valve 43 moves forwardly oil passes through 122 the small circularly shaped passage formed in washer 46 by the back of oil cup 123 and it leads from there into the vehicle's motor through passage 117 or 118 and oil line 64'. It should be noted that the front part of land 46 moves forward along with valve 43 and goes partially into the very front of bore 38 thereby preventing oil from passing from chamber 52 into chamber 46' while valve 43 is down. Therefore oil pressure is always automatically maintained in the accumulator while the motor of the vehicle is running. Thus, a standard adjustable relief valve may be attached to the accumulator and any of the many automotive accessories that work off hydraulic oil pressure may be attached to this valve and work off the oil pressure automatically produced by my invention and stored in the accumulator. The purpose of the relief valve is to always maintain enough oil pressure in the accumulator to work the hydraulic hand brake of my invention. This is brought about by adjusting the relief valve so that it will only relieve a certain amount of oil to the accessories the rest being maintained in the accumulator to work the hydraulic hand brake.

As this ignition switch also combines a hydraulic hand brake system, it is apparent that there must be communication between the master brake cylinder, the accumulator and the oil supply system of the motor. To facilitate such connection the wall of the piston 34 to the rear of the head 36 is provided with a series of oil passages, such as shown in Fig. 7.

When this ignition system is in the "off" position the oil pump is not in operation and the oil is not under pressure. The oil as stored in the accumulator passes through the oil passage 114 and leads into the center bore 38, through the passage 47' between lands 46 and 47. From there it leads into the oil passage extending from the center bore 38 to passage 115 which is open to the master brake cylinder's oil port 63. Under such conditions, it is apparent that the brakes are on. However, should the oil pressure ever drop in chamber 52, because of an oil or air leak in the accumulator, etc. to predetermined poundage considered safe enough to maintain the hydraulic hand brake on, the valve 43 and land 47 would fall down from its valve seat and block the oil passage leading from the accumulator to the master brake cylinder, thereby trapping the oil pressure previously stored in the master brake cylinder. This maintains the brakes on, even if the accumulator itself becomes defective.

Passage 116 is open to the center bore 38 through the passage 46' which is between valve head 48 and land 46, but, because the motor is not running, no oil passes through it. Passages 117 and 118, which lead into the center bore 38 at the same point or circumference as passage 116, are closed to 64, the motor's oiling port, but they are open to passage 116.

Oil passage 119 connects chamber 52 to oil passage 115 and it is always open to it. Passage 115 leads to the accumulator in the "off" position through the center bore 38 and oil passage 114. Therefore, the oil pressure in chamber 52 is the same as the oil pressure in the accumulator except when and if valve 43 moves forward and blocks the oil passage from the accumulator to passage 115 as previously mentioned.

When the ignition key 25 is turned to the "D" (drive) position, the motor starts as hereinbefore described, and upon initial movement of the piston 34, the passage 120 opens up to both brake port 63 and the drain port 65, thus releasing the brakes.

Passage 117 opens up to the motor's oiling port 64 and as passage 116 is open to passage 117 through center bore 38 oil is sent through passage 117, while the motor is running, to the motor's oil line 64'. As the piston 34 moves forward, the front top part of the passage 114 is exposed to chamber 32. Passage 115 is open to the accumulator port 66, and to passage 114 by way of chamber 38. Thus, oil flows out of the accumulator into passage 115, from there into the center bore 38, from the center bore 38 into passage 114, from thence to the outer chamber 32, from there into passage 116, from passage 116 to passage 46' in between valve head 48 and land 46, from there into passage 117 and then passes out of piston 34 into the motor's oil line 64'. This then produces the advantage of pre-starting oil pressure in the motor's oiling system which is maintained long enough to allow the regular oil pressure produced by the oil pump to blend in with it so that motor will have continuous oil pressure while it is being started. This also automatically primes the motor's oil pump.

It should be noted that when the accumulator's oil pressure is dissipated to a predetermined poundage, valve 43 will fall downward and block the oil passage from passages 115 to 114, thereby trapping enough oil pressure in the accumulator to work the hydraulic brakes many times should the motor fail to start and the ignition key 25 is turned back to the "off" or "BR" position.

It should be also noted that as the oil pressure in chamber 32 dissipates to a predetermined poundage, piston 34 will move forward via spring 42 and automatically start the vehicle's motor as hereinbefore described. Although it takes only a very short time for this action to take place, it may become necessary to start the motor immediately and this may be done by pushing in on ignition key 25 and face plate 17 (while the ignition key 25 is in the "D" or "BR" position of face plate 17) thereby forcing the piston 34 downwardly and starting the motor of the vehicle as hereinbefore described.

To replace oil pressure in the accumulator, oil under pressure passes from chamber 32 through valve 56 into chamber 52 from whence it passes into oil route 119, which is open to oil route 115. Therefore because passage 115 is open to the accumulator's oil port in the "D" (drive) and "P" (pushing) and "BR" (braking) positions, oil is allowed to pass from chamber 32 into the accumulator and to be built up there.

After the engine is running, oil from line 61 passes into chamber 32, forcing the piston 34 back out of its seat 33, as hereinbefore described. The oil then passes through passage 117 and back to the motor via port 64.

When the ignition key 25 is turned to the "BR" (brakes-on, but motor running) position, essentially the same pre-starting oil routes are employed as previously mentioned in the "D" (drive) position. However, a slightly different route is taken: Passage 118 opens to the motor's oiling port 64' instead of passage 117 and passage 120 does not come into line with the brake port 62 to drain it. Therefore the brakes remain on. After the motor is automatically started, oil is fed to the motor's oiling port 64' through passage 118.

In the "T" (towing) position, passage 115 comes into line with the drain port 65 and the brake port 62. This releases the brakes (this is possible because the ignition key 25 is rotated backwardly). Passage 114 moves out of line with the accumulator's oil port 65 and therefore the accumulator no longer communicates with passage 115. Thus, only the brakes are drained and not the accumulator.

In "P" (pushing) position, the oil routes are essentially the same as they were in the "D" position.

In the "H" (hood) position, the oil routes are essentially the same as they were in the "Off" position.

Another feature of my invention is found in the automobile hood release which is operated off the ignition key 25. As the key 25 is turned to either the "H" (hood) or the "BR" (brakes-on but motor running) position, of the face plate 17, the lug 24 of the lock housing 23 is in contact with the screw head 24' which is in turn connected to the hood release cable 26'. The housing 13 is provided with raceways 121 which when the key 25 is turned to either the "H" or the "BR" position become aligned with the rear portion of the protruding fingers 28 so that the lock 26 and the sleeve 16 may be withdrawn from within the housing 13 a sufficient distance to permit the hood lock (not shown) to be opened. It should be noted that the brakes are on in both the "H" and the "BR" position. This is a safety feature that prevents a motorist from accidentally opening the hood while the brakes are off. However, once the hood is opened the ignition key 25 may be deliberately rotated to any position desired. Also the motor is running in the "BR" position and it is not in the "H" position. Thus the hood may be opened with or without the motor running. It should also be noted that some of the pulling presure needed to open the hood is supplied by spring 42.

By the aforedescribed construction, it should be noted that my invention provides for automatically stall-starting whenever such is needed. This is accomplished by the fact that if the motor dies, oil from the pump which normally passes through hose 61 to the oil chamber 32 is discontinued. This permits piston 34 to move forward into the chamber 32 by reason of the spring 42, and such movement of piston 34 will allow pin 71 to fall into the routes 92 and energize the starter motor.

My improved ignition and brake switch affords automobiles employing it to become virtually theft-proof. The automobile can not be started and moved just by crossing the ignition wires in the manner in which most present-day cars are started feloniously by car thieves. If a thief does start the motor he cannot release the brakes and as my switch also controls entry to the motor hood, the thief cannot successfully get at the motor to make the necessary adjustments whereby the brakes may be released and the automobile moved.

While I have illustrated and described the preferred form of construction for carrying my invention into effect, this is capable of variation and modification without departing from the spirit of the invention. I, therefore do not wish to be limited to the precise details of construction set forth, but desire to avail myself of such variations and modifications as come within the scope of the appended claims.

Having thus described my invention, what I claim as new and desire to protect by Letters Patent is:

1. A hydraulically operated ignition switch and brake control device for an automobile comprising a housing, a piston confined in said housing and rotatably and longitudinally movable therein, said piston having fluid routes formed therein, a brake fluid conduit of said automobile brake contral device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, key release means for initially rotating said piston to disrupt communication between said accumulator fluid conduit and said brake fluid conduit to place said brake control device in an inoperative condition and to open communication between the brake fluid conduit and the motor fluid conduit, spring means for moving said piston in one direction in said housing, means responsive to the movement of said piston in said one direction for rotating said piston after said initial rotation thereof by said key release means, and pressure-actuated means for moving said piston longitudinally in an opposite direction within said housing.

2. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication wtih said brake fluid conduit and said accumulator fluid conduit when said piston is in said predetermined position, electrical circuit control means associated with said housing and including a movable conductor member, means actuated by movement of said piston in said housing for moving said conductor member, manually actuated means for initially rotating said piston to disrupt communication between said accumulator fluid conduit to place said brake control device in an inoperative condition and said brake fluid conduit and to open communication between the brake fluid conduit and the motor fluid conduit, spring means for moving said piston in one direction in said housing, means responsive to the movement of said piston in said one direction for rotating said piston after said initial rotation thereof by said manually actuated means, and pressure-actuated means for moving said piston longitudinally in an opposite direction within said housing.

3. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, key release means for initially rotating said piston to disrupt communication between said accumulator fluid conduit to place said brake control device in an inoperative condition and said brake fluid conduit and to open communication between the brake fluid conduit and the motor fluid conduit, means for moving said piston in one direction in said housing, means responsive to the movement of said piston in said one direction for rotating said piston after said initial rotation thereof by said key release means, and pressure-actuated means for moving said piston longitudinally in an opposite direction within said housing.

4. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, manually actuated means for initially rotating said piston to disrupt communication between said accumulator fluid conduit to place said brake control device in an inoperative condition and said brake fluid conduit and to open communication between the brake fluid conduit and the motor fluid conduit, means for moving said piston in one direction in said housing, means responsive to the movement of said piston in said one direction for rotating said piston after said initial rotation thereof by said manually actuated means, and pressure-actuated means for moving said piston longitudinally in an opposite direction within said housing.

5. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, key release means for initially rotating said piston to disrupt communication between said accumulator fluid conduit and said brake fluid conduit to place said brake control device in an inoperative condition and to open communication between the brake fluid conduit and the motor fluid conduit, spring means for moving said piston in one direction in said housing, means including a spring held pin and cooperative grooves formed in said piston responsive to the movement of said piston in said one direction for rotating said piston after said initial rotation thereof by said key release means, and pressure-actuated means for moving said piston longitudinally in an opposite direction within said housing.

6. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, manually actuated means for initially rotating said piston to disrupt communication between said accumulator fluid conduit to place said brake control device in an inoperative condition and said brake fluid conduit and to open communication between the brake fluid conduit and the motor fluid conduit, spring means for moving said piston in one direction in said housing, means including a spring held pin and cooperative grooves formed in said piston responsive to the movement of said piston in said one direction for rotating said piston after said initial rotation thereof by said manually actuated means, and pressure-actuated means for moving said piston longitudinally in an opposite direction within said housing.

7. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, key release means for initially rotating said piston to disrupt communication between said accumulator fluid conduit to place said brake control device in an inoperative condition and said brake fluid conduit and to open communication between the brake fluid conduit and the motor fluid conduit, means for moving said piston in one direction in said housing, means including a spring held pin and cooperative grooves formed in said piston responsive to the movement of said piston in said one direction for rotating said piston after said initial rotation thereof by said key release means, and pressure-actuated means for moving said piston longitudinally in an opposite direction within said housing.

8. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, manually actuated means for initially rotating said piston to disrupt communication between said accumulator fluid conduit to place said brake control device in an inoperative condition and said brake fluid conduit and to open communication between the brake fluid conduit and the motor fluid conduit, means for moving said piston in one direction in said housing, means including a spring held pin and cooperative grooves formed in said piston responsive to the movement of said piston in said one direction for rotating said piston after said initial rotation thereof by said manually actuated means, and pressure-actuated means for moving said piston longitudinally in an opposite direction within said housing.

9. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, said means including a spring resisted pin operatively connected to said conductor member and a cooperating groove in said piston and in which said pin projects, key release means for initially rotating said piston to disrupt communication between said accumulator fluid conduit and said brake fluid conduit to place said brake control device in an inoperative condition and to open communication between the brake fluid conduit and the motor fluid conduit, spring means for moving said piston in one direction in said housing, means responsive to the movement of said piston in said one direction for rotating said piston after said initial rotation thereof by said key release means, and pressure-actuated means for moving said piston longitudinally in an opposite direction within said housing.

10. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, said means including a spring resisted pin operatively connected to said conductor member and a cooperating groove in said piston and in which said pin projects, means actuated by movement of said piston in said housing for moving said conductor member, manually actuated means for initially rotating said piston to disrupt communication between said accumulator fluid conduit to place said brake control device in an inoperative condition and said brake fluid conduit and to open communication between the brake fluid conduit and the motor fluid conduit, spring means for moving said piston in one direction in said housing, means responsive to the movement of said piston in said one direction for rotating said piston after said initial rotation thereof by said manually actuated means, and pressure-actuated means for moving said piston longitudinally in an opposite direction within said housing.

11. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, said means including a spring resisted pin operatively connected to said conductor member and a cooperating groove in said piston and in which said pin projects, key release means for initially rotating said piston to disrupt communication between said accumulator fluid conduit and said brake fluid conduit to place said brake control device in an inoperative condition and to open communication between the brake fluid conduit and the motor fluid conduit, means for moving said piston in one direction in said housing, means responsive to the movement of said piston in said one direction for rotating said piston after said initial rotation thereof by said key release means, and pressure-actuated means for moving said piston longitudinally in an opposite direction within said housing.

12. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, said means including a spring resisted pin operatively connected to said conductor member and a cooperating groove in said piston and in which said pin projects, manually actuated means for initially rotating said piston to disrupt communication between said accumulator fluid conduit and said brake fluid conduit to place said brake control device in an inoperative condition and to open communication between the brake fluid conduit and the motor fluid conduit, means responsive to the movement of said piston in said one direction for rotating said piston after said initial rotation thereof by said manually actuated means, and pressure-actuated means for moving said piston longitudinally in an opposite direction within said housing.

13. A hydraulically operated ignition switch and brake control device for an automobile comprising a housing, a piston confined in said housing and rotatably and longitudinally movable therein, said piston having fluid routes formed therein, a brake fluid conduit of said automobile brake control device communicating with one of said fluid routes when said piston is in a predetermined position within said housing, an accumulator fluid conduit communicating with another of said fluid routes and said brake fluid conduit when said piston is in said predetermined position to maintain said brake control device in an operative condition, a motor fluid conduit communicating with another of said fluid routes and out of communication with said brake fluid conduit and said accumulator fluid conduit when said piston is in said predetermined position, electrical circuit control means associated with said housing and including a movable conductor member, means actuated by movement of said piston in said housing for moving said conductor member, said means including a spring resisted pin operatively connected to said conductor member and a cooperating groove in said piston and in which said pin projects, manually actuated means for initially rotating said piston to disrupt communication between said accumulator fluid conduit to place said brake control device in an inoperative condition and said brake fluid conduit and to open communication between the brake fluid conduit and the motor fluid conduit, means for moving said piston in one direction in said housing, means including a spring held pin and cooperative grooves formed in said piston responsive to the movement of said piston in said one direction for rotating said piston after said initial rotation thereof by said manually actuated means, and pressure-actuated means for moving said piston longitudinally in an opposite direction within said housing.

References Cited in the file of this patent

UNITED STATES PATENTS

| | | |
|---|---|---|
| 1,972,300 | Hemingway | Sept. 4, 1934 |
| 2,189,403 | Phillips | Feb. 6, 1940 |
| 2,245,958 | Barr et al. | June 17, 1941 |
| 2,266,213 | Kattwinkel | Dec. 16, 1941 |
| 2,594,155 | Guernsey et al. | Apr. 22, 1952 |